United States Patent [19]

Leslie

[11] Patent Number: 4,513,446

[45] Date of Patent: Apr. 23, 1985

[54] CONTROL CIRCUIT FOR A RADIO TRANSCEIVER

[75] Inventor: Samuel A. Leslie, Forest, Va.

[73] Assignee: General Electric Company, Lynchburg, Va.

[21] Appl. No.: 465,164

[22] Filed: Feb. 9, 1983

[51] Int. Cl.³ .............................................. H04B 1/38
[52] U.S. Cl. ..................................... 455/73; 455/127; 455/343
[58] Field of Search ....................... 455/73, 78, 79, 89, 455/99, 345, 127, 343; 179/2 EA

[56] References Cited

U.S. PATENT DOCUMENTS

| | | |
|---|---|---|
| 3,307,051 | 2/1967 | Parsons .................................. 455/89 |
| 3,500,458 | 3/1970 | Cannalte ............................. 455/127 |
| 3,541,453 | 11/1970 | Vanderpoel et al. . |
| 3,962,553 | 6/1976 | Linder et al. . |
| 4,095,184 | 6/1978 | Hochstein et al. . |
| 4,227,257 | 10/1980 | Sato . |

Primary Examiner—Jin F. Ng
Attorney, Agent, or Firm—James J. Williams; Robert C. Lampe, Jr.

[57] ABSTRACT

A vehicular radio transceiver is normally powered by a vehicular ignition switch and a transceiver on-off switch both being closed. A latch circuit senses the presence of communication over the transceiver, and produces a latch signal that powers the transceiver despite opening of either of the switches.

4 Claims, 1 Drawing Figure

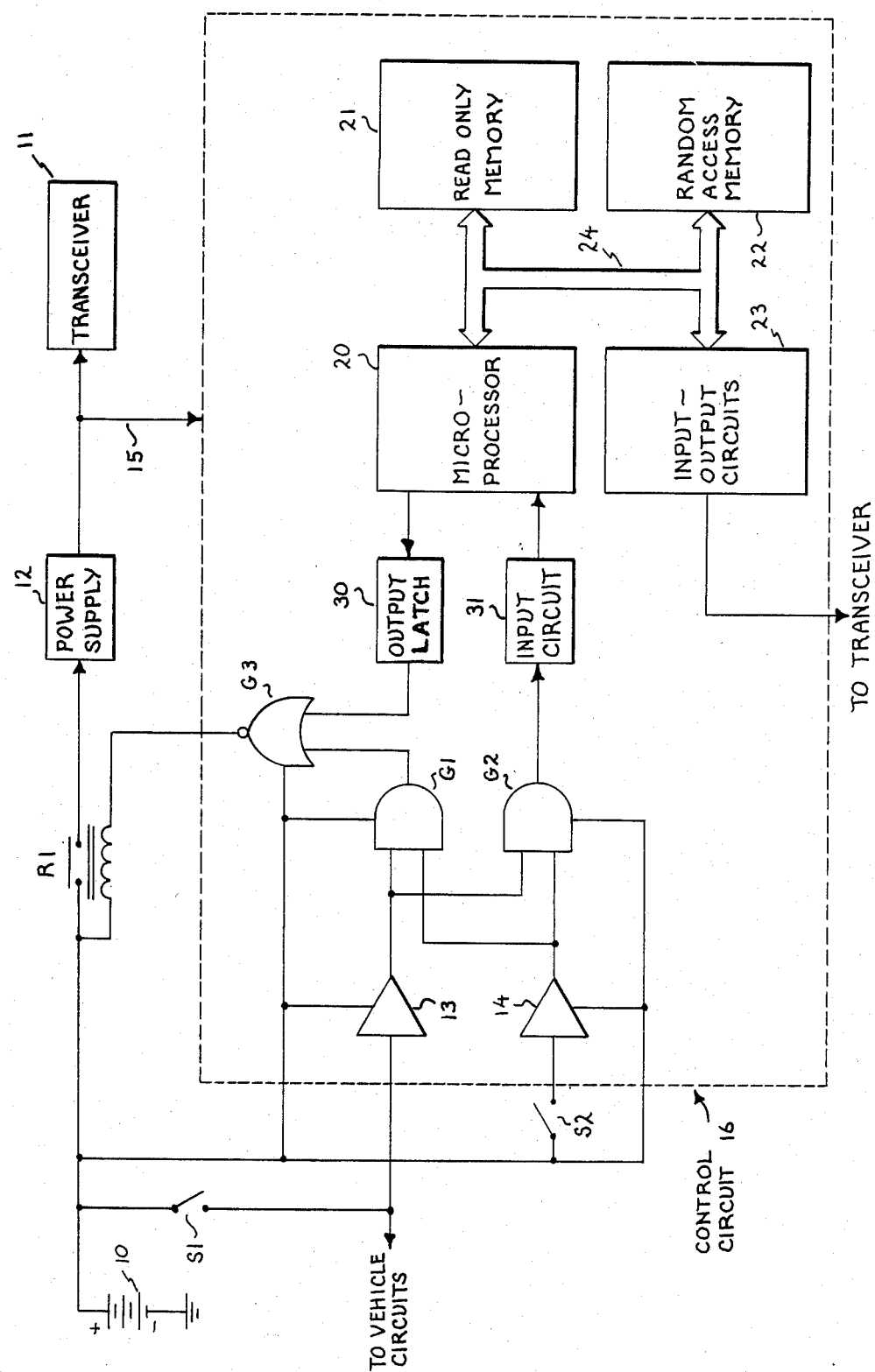

CONTROL CIRCUIT FOR A RADIO TRANSCEIVER

BACKGROUND OF THE INVENTION

My invention relates to a control circuit for a radio transceiver or the like, and particularly to such a control circuit that prevents the radio transceiver from being inadvertently turned off during operation by the user opening a vehicular ignition switch or a transceiver on-off switch.

Prior art radio transceivers presently used in mobile vehicles, particularly automobiles, are powered by the vehicular ignition switch. When the ignition switch is in the on or accessory position, the transceiver can be powered. In addition a transceiver on-off switch is placed in series between the ignition switch and the transceiver so that the transceiver can be turned off even though the ignition switch is on, and so that the transceiver will be turned off when the ignition switch is off, so as to prevent discharging the vehicular battery if a user leaves the on-off switch in the on position.

However, the status or position of the ignition switch creates a problem in the radio transceivers which use some form of automatic or program control to establish and maintain a call. This is particularly true in mobile telephone or cellular transceivers. For example, if the vehicle stalls and requires restarting, or if the user has reached his destination and turned the ignition switch off, the program controlled radio connection will be broken. As a result, the user's conversation with the distant base station or telephone station will be lost, since the transceiver was turned off by the ignition switch. Relatively simple transceivers that do not require an automatic or program control technique, such as crystal controlled or frequency synthesized push-to-talk transceivers, do not have this problem, since the call can be restored by simply turning the radio back on. However, the automatic or program type of radio control will result in a call being lost since the program must be re-established or reinitiated from the beginning once the transceiver is turned back on. In addition, relevant data or information, such as the channel number being used, the loop tone frequency being used, the power level setting being used, and other information are lost. Furthermore, re-establishing a call can result in additional billing charges.

Accordingly, there is a definite need for some arrangement or feature which maintains a vehicular transceiver in the on or operating condition despite the vehicular ignition switch or the transceiver on-off switch inadvertently or intentionally being turned off.

SUMMARY OF THE INVENTION

Briefly, I provide a circuit to sense the closing of the vehicular ignition switch and the transceiver on-off switch. A first control signal is produced in response to the closing of both switches to supply power to the transceiver. Once a call is established over the powered transceiver, a second control signal is produced to continue supplying power to the transceiver, even though the ignition switch and/or the on-off switch are turned off by the user. The power is removed from the transceiver only after the established call has ended. Thus, a call established by an automatic or program control, such as in a cellular radio telephone system, will not be interrupted by operation of a vehicular ignition switch or a transceiver on-off switch.

BRIEF DESCRIPTION OF THE DRAWING

The subject matter which I regard as my invention is particularly pointed out and distinctly claimed in the claims. The structure and operation of my invention, as well as advantages, may be better understood from the following description given in connection with the accompanying drawing, in which:

The single FIGURE shows a schematic diagram of a preferred embodiment of my invention.

DESCRIPTION OF THE PREFERRED EMBODIMENT

As mentioned earlier, my invention is primarily intended to be used with a vehicular radio transceiver for providing communication in cellular radio telephone systems. Since such a transceiver is used primarily in an automobile, I have shown an automobile battery 10 which provides power to various vehicular circuits through an ignition switch S1. Such a switch S1 has a starting contact (not shown) and an accessory contact as shown.

Power for a radio transceiver 11 is provided through normally open contacts of a relay R1 and through a power supply 12 which converts the battery voltage to the proper voltages for the transceiver 11. The relay R1 can be replaced by a suitable solid state switching device.

A dashed line rectangle indicates and encloses my control circuit 16. The circuit 16 includes suitable voltage converters 13, 14 which convert the battery voltage supplied by the ignition switch S1 and by a manual transceiver on-off switch S2 to appropriate logic voltages. The output of the voltage converter 13 is supplied to one input of an AND gate G1 and to one input of an AND gate G2. The output of the voltage converter 14 is supplied to the other input of the AND gate G1 and to the other input of the AND gate G2. The output of the AND gate G1 is supplied to one input of a NOR gate G3. Because the converters 13, 14 and the gates G1, G2, G3 must be continuously operated, they are provided with direct connections to the battery 10. For simplicity, I have assumed that the converters 13, 14 and the gates G1, G2, G3 can operate from the voltage supplied by the battery 10. If they cannot so operate, they would include suitable voltage converting circuits.

The remainder of the control circuit 16 is supplied with power from the power supply 12 as indicated by a lead 15 which extends to the dashed line rectangle. I have not shown the lead 15 going directly to the other elements in the circuit 12 to keep the drawing as clear as possible. These other elements include a microprocessor or other stored program device 20, a read only memory 21, a random access memory 22, and input-output circuits 23. These elements 20, 21, 22, 23 are usually already provided in a cellular radio transceiver, and normally have the capability to provide the added functions needed by my control circuit. The elements 20, 21, 22, 23 are connected together, as indicated by the arrows 24, to provide whatever functions are desirable for controlling the transceiver 11 through signals provided by the input-output circuits 23. A person of ordinary skill would know how to make those connections.

A particular output for operating my circuit is derived from the microprocessor 20 and supplied to an output latch 30. The output latch 30 responds to a call set up on the radio transceiver 11 by the microprocessor 20 and its associated circuits, and supplies this output signal as long as the call is in progress, and thereafter until the telephone handset (or similar instrument) is replaced on its hookswitch, or until the user manually operates a switch to end the call. I have assumed that the output from the latch 30 is a logic 0 for no call and a logic 1 for a call in progress. This output is applied to the other input of the NOR gate G3. Also, the output of the AND gate G2 is supplied to an input circuit 31 which, in response to signals from the gate G2, supplies this information to the microprocessor 20.

The operation of my invention in a vehicular radio transceiver will be described in connection with the following table:

| Line | Event | Ignition Switch S1 | On-Off Switch S2 | AND Gate G1 | AND Gate G2 | Output Latch 30 | NOR Gate G3 | Power Supply 12 |
|---|---|---|---|---|---|---|---|---|
| 1 | All off | 0 | 0 | 0 | 0 | 0 | 1 | Off |
| 2 | Turn on ignition switch S1 | 1 | 0 | 0 | 0 | 0 | 1 | Off |
| 3 | Turn on radio switch S2 | 1 | 1 | 1 | 1 | 0 | 0 | On |
| 4 | Place call | 1 | 1 | 1 | 1 | 1 | 0 | On |
| 5 | Turn off ignition switch S1 | 0 | 1 | 0 | 0 | 1 | 0 | On |
| 6 | Turn off radio switch S2 | 0 | 0 | 0 | 0 | 1 | 0 | On |
| 7 | Call ends | 0 | 0 | 0 | 0 | 0 | 1 | Off |

In line 1 of the table, I have assumed that the vehicle and transceiver are in the idle condition so that the ignition switch S1 and the on-off switch S2 are open. However, the converters 13, 14 and the gates G1, G2, G3 are receiving power and are responsive. With the ignition switch S1 open and with the on-off switch S2 open, logic 0's are supplied to the AND gates G1, G2. Hence, each of these gates G1, G2 produces a logic 0. Likewise, with no call being placed, the output latch 30 also produces a logic 0. Hence, the NOR gate G3 produces a logic 1, a condition I have assumed prevents the winding of the relay R1 from being energized, so that the power supply 12 is turned off.

In line 2 of the table, I assume that a user turns on the ignition switch S1. This supplies a logic 1 to the gates G1, G2. However, the on-off switch S2 is still open, so that logic 0's are supplied to the other inputs of the gates G1, G2. Hence, the gates G1, G2 continue to produce a logic 0, and the gate G3 produces a logic 1 so that the power supply 12 remains off.

As shown in line 3, I assume that the radio transceiver 11 is turned on by closing the on-off switch S2. With the ignition switch S1 still closed, logic 1's are supplied to both inputs of the gates G1, G2, so that these gates produce logic 1's at their output. The logic 1 applied to the one input of the NOR gate G3 causes the gate G3 to produce a logic 0, a condition I have assumed causes the winding of the relay R1 to become energized. When energized, the relay contacts close to supply power from the battery 10 to the power supply 12. This energizes the transceiver 11 and the other components or elements of the control circuit 12. At the same time, the gate G2 produces a logic 1 which, by means of the input circuit 31, alerts the microprocessor 20 that the radio is to be turned on. This turn-on is achieved by appropriate microprocessor signals applied through the input-output circuits 23 to the transceiver 11.

In line 4, I have assumed that a user places a call on his transceiver 11 by appropriate operations achieved through the microprocessor 20. In accordance with my invention, an appropriate signal from the microprocessor 20 is supplied to the output latch 30 to cause the latch 30 to produce a logic 1. This logic 1 causes the gate G3 to continue to produce a logic 0, even though the output from the gate G1 may, as will be described, return to a logic 0.

As shown in line 5, I have assumed that the driver or operator of the vehicle has, for some reason, such as coming to a stop or restarting his vehicle, turned off his ignition switch S1. This causes the gates G1, G2 to produce logic 0's. Were it not for the logic 1 supplied by the output latch 30, the gate G3 would produce a logic 1 and de-energize the relay R1. However, the output logic 1 from the latch 30 causes the gate G3 to keep the relay R1 energized so that power continues to be supplied to the transceiver 11 and control circuit 12. Such continuing power insures that the call already in progress is not interrupted or broken, with the resultant loss of communication and necessity of re-establishing the call.

At line 6, I have assumed that the user accidentally or intentionally turns off his radio by opening the on-off switch S2. Again, as described in connection with line 5, the output latch 30 continues to produce a logic 1 that maintains supplying power to the transceiver 11 and control circuit 12 if a call is in progress.

And finally, at line 7, I have assumed that the call in progress is ended. This is usually achieved by the user placing his telephone handset back on its hook, or by operating an end-of-call switch. When this occurs, the microprocessor 20 produces an appropriate signal to the latch circuit 30 so that the circuit 30 produces a logic 0. If the switches S1, S2 are open, both inputs to the gate G3 are at a logic 0 so that its logic 1 output de-energizes the winding of the relay R1 to open the relay contacts and remove power from the transceiver 11 and the remainder of the control circuit 12.

It will thus be seen that I have provided a new and improved control circuit for particular use with a mobile vehicle, such as an automobile, to insure continued power to a radio transceiver 11 or the like despite inadvertent or intentional opening of the vehicular ignition switch and the transceiver on-off switch. My invention can be used in other applications. While I have shown only one embodiment, persons skilled in the art will appreciate the modifications and substitutions that can be made. For example, other logic arrangements can be substituted for the gates G1, G2, G3 to control the relay R1. Likewise, signals for the output latch 30 can be derived at any suitable place in the control circuit other than from the microprocessor 20. And, if desired, a timing circuit may be provided in the microprocessor 20 to disconnect a call if the ignition switch is left in the off state for an extended period of time. Such a situation might arise if a user turned off the ignition switch S1 during a call, and forgot to replace his handset or operate an end-of-call switch at the end of the call. The timer could respond to a logic 0 produced by the gate G2 in line 5 of the table and to a call still in progress to produce a signal that causes an indication, such as an audible tone or a flashing light. This would alert the user that his call will be switched off unless he closes his ignition switch again. Therefore, while my invention has been described with reference to a particular embodiment, it is to be understood that modifications may be made without departing from the spirit of the invention or from the scope of the claims.

What I claim as new and desire to secure by Letters Patent of the United States is:

1. A control circuit for a radio transceiver comprising:
   a. a vehicular ignition switch coupled to a power source and having open and closed conditions;
   b. a transceiver on-off switch coupled to said power source and having open and closed conditions;
   c. first means coupled to said ignition and transceiver switches for sensing the conditions of both of said switches and producing a power-on signal in response to both said conditions being sensed;
   d. second means coupled to said radio transceiver for sensing a communication thereon and producing a latch signal in response to and for the duration of said communication;
   e. and third means coupled to said first means and to said second means for supplying power to said radio transceiver from said power source in response to said power-on signal or in response to said latch signal, or in response to both said power-on signal and said latch signal, said third means continue to supply power to said transceiver in response to and for the duration of said latch signal, despite the absence of said power-on signal.

2. Apparatus for controlling the operation of a radio transceiver in a mobile vehicle having an ignition switch and a battery, comprising:
   a. radio transceiver on-off switch;
   b. a control circuit connected to the ignition switch and said transceiver switch for supplying power from the battery to the transceiver in response to the positions of said switches;
   c. a power supply for converting battery voltage to appropriate voltage for the transceiver and said control circuit; and
   d. relay means activated by said control circuit for connecting said power supply to the battery; whereby, with said transceiver and ignition switches closed, said control circuit activates said relay means to provide power to the transceiver and continues to activate said relay means if the ignition switch is thereafter opened with said transceiver switch closed.

3. The apparatus of claim 2 in which said control circuit comprises:
   a. a microprocessor and an associated memory;
   b. means for converting battery voltage to appropriate logic voltage for said microprocessor;
   c. first and second logic gates connected to the battery and the output of said voltage converting means;
   d. a third logic gate connected to the battery and the output of said first logic gate; and
   e. an output latch for receiving input signals from said microprocessor in response to calls from the transceiver and for providing output signals to said third gate, the output of which activates said relay means.

4. The apparatus of claim 2 wherein, with said transceiver and ignition switches closed, said control circuit continues to activate said relay means if the transceiver switch is thereafter opened with the ignition switch closed.

* * * * *